United States Patent
van Heyningen

[19]

[11] Patent Number: 5,835,057
[45] Date of Patent: Nov. 10, 1998

[54] MOBILE SATELLITE COMMUNICATION SYSTEM INCLUDING A DUAL-FREQUENCY, LOW-PROFILE, SELF-STEERING ANTENNA ASSEMBLY

[75] Inventor: Martin Kits van Heyningen, Newport, R.I.

[73] Assignee: KVH Industries, Inc., Middletown, R.I.

[21] Appl. No.: 792,932

[22] Filed: Jan. 22, 1997

Related U.S. Application Data

[60] Provisional application No. 60/010,696, Jan. 26, 1996.

[51] Int. Cl.⁶ .................................................... H01Q 3/00
[52] U.S. Cl. ........................................ 342/359; 343/757
[58] Field of Search ........................... 342/359; 343/757, 343/762, 838, 839

[56] References Cited

U.S. PATENT DOCUMENTS

| | | | |
|---|---|---|---|
| 2,846,678 | 8/1958 | Best | 343/727 |
| 3,550,135 | 12/1970 | Bodmer | 343/725 |
| 3,623,111 | 11/1971 | Provencher et al. | 343/727 |
| 3,696,432 | 10/1972 | Anderson et al. | 343/761 |
| 3,701,161 | 10/1972 | Gregory | 343/770 |
| 4,089,003 | 5/1978 | Conroy | 343/700 MS |
| 4,095,230 | 6/1978 | Salmond et al. | 343/729 |
| 4,130,823 | 12/1978 | Hoople | 343/768 |
| 4,172,257 | 10/1979 | Mahner | 343/854 |
| 4,348,677 | 9/1982 | Salmond | 343/729 |
| 4,489,331 | 12/1984 | Salvat et al. | 343/753 |
| 4,647,938 | 3/1987 | Roederer et al. | 343/756 |
| 4,691,206 | 9/1987 | Shapter et al. | 343/700 MS |
| 4,775,866 | 10/1988 | Shibata et al. | 343/700 MS |
| 4,864,314 | 9/1989 | Bond | 343/700 MS |
| 4,866,454 | 9/1989 | Droessler et al. | 343/725 |
| 4,868,577 | 9/1989 | Wingerd | 343/713 |
| 5,023,623 | 6/1991 | Krienheder et al. | 343/725 |
| 5,055,852 | 10/1991 | Dusseuz et al. | 343/725 |
| 5,160,936 | 11/1992 | Braun et al. | 343/725 |
| 5,220,334 | 6/1993 | Raquenet et al. | 343/700 MS |
| 5,241,321 | 8/1993 | Tsao | 343/700 MS |
| 5,262,791 | 11/1993 | Tsuda et al. | 343/700 MS |
| 5,303,393 | 4/1994 | Noreen et al. | 455/3.2 |
| 5,319,378 | 6/1994 | Nalbandian et al. | 343/700 MS |
| 5,323,168 | 6/1994 | Itoh et al. | 343/700 MS |
| 5,347,286 | 9/1994 | Babitch | 342/359 |
| 5,398,035 | 3/1995 | Densmore et al. | 343/713 |
| 5,400,042 | 3/1995 | Tulintseff | 343/727 |
| 5,434,580 | 7/1995 | Raquenet et al. | 343/700 MS |
| 5,434,586 | 7/1995 | Kinoshita et al. | 343/840 |
| 5,436,453 | 7/1995 | Chang et al. | 250/338.1 |

FOREIGN PATENT DOCUMENTS

| | | |
|---|---|---|
| 362 9315 | 3/1988 | Germany . |
| 4010242 | 10/1991 | Germany . |
| 4081106 | 3/1992 | Japan . |
| 2240881 | 8/1991 | United Kingdom . |
| 2260448 | 4/1993 | United Kingdom . |

*Primary Examiner*—Theodore M. Blum
*Attorney, Agent, or Firm*—Wolf, Greenfield & Sacks, P.C.

[57] ABSTRACT

A mobile satellite communication system includes an antenna assembly mountable on a vehicle and a satellite tracking assembly. The antenna assembly includes an antenna device for receiving first satellite signals from a first satellite in a first frequency band and for transmitting and receiving second satellite signals to and from a second satellite in a second frequency band, and a drive subassembly for rotating the antenna device relative to the vehicle in response to a control signal. The satellite tracking assembly maintains the antenna device pointed at the first and second satellites as the vehicle moves. The system further includes a receiver coupled to the antenna device for receiving the first satellite signals and a transceiver coupled to the antenna device for transmitting and receiving the second satellite signals. The first satellite signals may be video and imagery data signals transmitted in the Ku band by a direct broadcast satellite. The second satellite signals may be two-way digital communication signals transmitted and received in the L band by an AMSC satellite.

29 Claims, 5 Drawing Sheets

MOBILE SATELLITE COMMUNICATION SYSTEM INCLUDING A DUAL-FREQUENCY, LOW-PROFILE, SELF-STEERING ANTENNA ASSEMBLY

CROSS-REFERENCE TO RELATED APPLICATION

This application claims the benefit of application Ser. No. 60/010,696, filed Jan. 26, 1996.

FIELD OF THE INVENTION

This invention relates to a system and antenna assembly for mobile satellite communication and, more particularly, to methods and apparatus for receiving video and imagery data signals from a direct broadcast satellite and for transmitting and receiving two-way digital communication signals to and from an AMSC satellite, in a moving vehicle.

BACKGROUND OF THE INVENTION

The Direct Broadcast System (DBS) satellites are used to transmit television and digital audio signals to service subscribers at stationary ground sites. The service is commonly known as digital satellite service (DSS). These satellites operate in the Ku band and are capable of sending very high quantities of data at very high data rates. Such a system is very useful for transmitting video, still image data such as photographs and maps, and large databases in a short span of time. In order for the DBS capabilities to be fully realized for certain applications, two additional factors must be addressed. The first is to keep a receiving antenna pointed at the beam of the DBS satellite while a vehicle is moving or, at a minimum, to quickly acquire and maintain track after vehicle movement. The other factor is that there must be a separate channel by which the user may request data and acknowledge receipt of data. The very high data rate capabilities of the DSS service currently limit it to a receive-only system. In order to request information or to acknowledge receipt, the user must be able to communicate through a return data link such as a land line or a cellular link. Voice or fax will economically achieve this goal. Therefore, a separate channel using voice and digital data at a lower data rate may be employed.

The AMSC satellite is used for two-way digital voice and fax communication in the L band. This system is designed to be used by military, law enforcement and other public sector activities to request data and to acknowledge receipt over the L band channel via the AMSC satellite. The AMSC satellite is located at latitude 101° W, within a degree of the DBS satellites. The AMSC satellite carries a low data rate voice and digital data in the L band, facilitating two-way voice and data request and receipt capability.

U.S. Pat. No. 4,348,677 issued Sep. 7, 1982 to Salmond discloses a common aperture dual-mode seeker antenna which includes a parabolic array of crossed dipoles. The parabolic array of crossed dipoles is substantially reflective to signals in one frequency band and substantially transmissive of signals outside the one frequency band. The antenna also includes a planar spiral antenna positioned on the convex side of the parabolic array in axial alignment with the parabolic array of crossed dipoles.

U.S. Pat. No. 5,303,393 issued Apr. 12, 1994 to Noreen et al. discloses a radio response system including a broadcast station, a satellite relay, a processing center, and a plurality of user terminals. Each user terminal has a broadcast receiver, a communications interface device, a controller and a data transmitter. The broadcast station broadcasts a program signal to a user. The controller generates a user data signal from identification information transmitted in connection with the program signal. The data transmitter transmits the user data signal to the satellite relay, which then re-broadcasts the signal to the processing center.

U.S. Pat. No. 5,398,035 issued Mar. 14, 1995 to Dinsmore et al. discloses a miniature, dual-band, two-way, satellite-tracking antenna system mounted on a movable vehicle. The satellite tracking antenna system receives K band data from the advanced communication technology satellite (ACTS). In addition, the satellite tracking antenna system transmits Ka band data to the ACTS satellite. The system includes a miniature parabolic reflector dish antenna and a truncated pyramidal feed horn.

U.S. Pat. No. 3,550,135 issued Dec. 22, 1970 to Bodmer discloses a dual beam parabolic antenna including a parabolic reflector which is fed by a feed horn. The reflector and the feed horn together form a first antenna which produces a first antenna radiation pattern. The antenna also includes individual radiating elements disposed in front of the parabolic reflector and fed by transmission lines on the rear side of the parabolic reflector. The radiating elements in combination with the parabolic reflector form a second antenna having a second radiation pattern.

U.S. Pat. No. 5,434,586 issued Jul. 18, 1995 to Kinoshita et al. discloses a multibeam antenna for simultaneously receiving waves transmitted from one or more communication satellites and a broadcast satellite which are spaced apart in stationary orbit positions. The antenna includes a single parabolic face used as a reflector, a first converter including a primary radiator for receiving communication satellite waves, at a first focal point of the parabolic antenna, and a second converter having a second primary radiator for receiving broadcast satellite waves at a second focal point of the parabolic antenna.

SUMMARY OF THE INVENTION

According to a first aspect of the invention, a mobile satellite communication system for use in a vehicle is provided. The system comprises an antenna assembly mountable on the vehicle and a satellite tracking assembly. The antenna assembly includes an antenna device for receiving first satellite signals from a first satellite in a first frequency band and for transmitting and receiving second satellite signals to and from a second satellite in a second frequency band, and a drive subassembly for rotating the antenna device relative to the vehicle in response to a control signal. The satellite tracking assembly determines the orientation of the antenna device and provides the control signal to the drive subassembly so as to maintain the antenna device pointed at the first and second satellites as the vehicle moves. The system further comprises a receiver coupled to the antenna device for receiving the first satellite signals in the first frequency band and a transceiver coupled to the antenna device for transmitting and receiving the second satellite signals in the second frequency band.

Preferably, the antenna device comprises a first antenna for receiving the first satellite signals in the first frequency band and a second antenna for transmitting and receiving the second satellite signals in the second frequency band. The first antenna may comprise a reflector that reflects the first satellite signals and a horn for receiving the reflected signals. The second antenna may be located behind the reflector. The reflector passes the second satellite signals in the second frequency band. Preferably, the first satellite signals comprise video and imagery data signals transmitted in the Ku band from a direct broadcast satellite. The second satellite signals preferably comprise two-way digital communication signals transmitted and received in the L band by an AMSC satellite. The direct broadcast satellite and the AMSC satellite are located in substantially identical geostationary orbits.

According to another aspect of the invention, an antenna system for use with a mobile satellite communication system is provided. The antenna system comprises an antenna assembly mountable on a vehicle and a satellite tracking assembly. The antenna assembly includes an antenna device for receiving first satellite signals from a first satellite in a first frequency band and for transmitting and receiving second satellite signals to and from a second satellite in a second frequency band, and a drive subassembly for rotating the antenna device relative to the vehicle in response to a control signal. The satellite tracking assembly determines the orientation of the antenna device and provides a control signal to the drive subassembly so as to maintain the antenna device pointed at the first and second satellites as the vehicle moves.

According to a further aspect of the invention, a method for satellite communication in a vehicle is provided. An antenna assembly is mounted on the vehicle. The antenna assembly includes an antenna device and a drive subassembly for rotating the antenna device relative to the vehicle in response to a control signal. Video and imagery data signals from a direct broadcast satellite in the Ku band are received with the antenna device. Two-way digital communication signals are transmitted and received to and from an AMSC satellite in the L band with the antenna device. The control signal is provided to the drive subassembly so as to maintain the antenna device pointed at the direct broadcast satellite and the AMSC satellite as the vehicle moves.

BRIEF DESCRIPTION OF THE DRAWINGS

For a better understanding of the present invention, reference is made to the accompanying drawings, which are incorporated by reference and in which.

DETAILED DESCRIPTION

The present invention relates to a system, antenna assembly and method for mobile satellite communication. The antenna assembly includes an antenna device mounted on a single pedestal, or base, which is in turn mounted on a vehicle. The vehicle may be a sedan, such as a police cruiser, a truck, a recreational vehicle, a bus, an HMMWV, a train, a boat, or any other vehicle. The antenna assembly is part of a communication system which receives real-time video and imagery data via the DBS satellite and which transmits and receives two-way secure voice and facsimile data via the American Mobile Satellite Communication (AMSC) satellite. The communication system and the antenna assembly are designed to take advantage of the fact that the DBS satellite and the AMSC satellite are in substantially the same geostationary orbit, within one degree with respect to ground observers. Since the orientation of the antenna device relative to the geostationary satellites changes when the vehicle is moving, the system is provided with a satellite tracking assembly that compensates for changes in one or all of roll, pitch or yaw of the antenna device relative to the satellites and maintains the antenna device pointed at the satellites.

In order to provide the system with the capability to continuously receive real-time video and imagery data and to communicate with two-way voice/facsimile data, several objectives must be met. First, to be continuously pointed at the multiple satellites while the vehicle is moving, the antenna assembly must maintain tracking of the satellite upon initial reception of a signal or temporary loss of a signal. To this end, the system includes a satellite tracking assembly as discussed below. Second, a separate channel must be provided so that the user may request the video and imagery data and acknowledge receipt of the data. Additional objects include minimizing the number of antennas used and providing an overall antenna configuration that is small enough to conveniently fit on a vehicle.

The mobile communication system of the present invention is designed to take advantage of the fact that the DBS satellite and the AMSC satellite are positioned close together in a geostationary orbital slot. The DBS satellite sends a spot beam transmission of digital video data to the earth, which is then converted into TV or FM radio signals. The AMSC satellite is used for two-way digital voice and facsimile communication in the L band frequency range. Because the satellites are in the same orbital vicinity, the antenna device can be pointed at one satellite and maintain continuous communication with both satellites. In particular, the satellites are located in a geostationary orbit at 101° west longitude. The digital satellite service includes a cluster of four DBS satellites within one half degree. The AMSC satellite is located within the cluster of DBS satellites. All five satellites are located within one degree.

The DBS satellites operate in the sky frequency band of 12.2–12.7 gigahertz, with a GIT (ratio of antenna gain to antenna system noise temperature) performance of approximately 12.7 dB/K and a beamwidth of approximately 4°. The AMSC reception capability requires operation in the sky frequency band of 1525–1559 megahertz, with G/T performance of approximately −16 dB/K. The AMSC transmission capability requires operation in the sky frequency band of 1626–1660 megahertz, with an EIRP (effective isotropic radiated power) of approximately 12.5 dBW and a beamwidth of approximately 15°.

Figure 1:
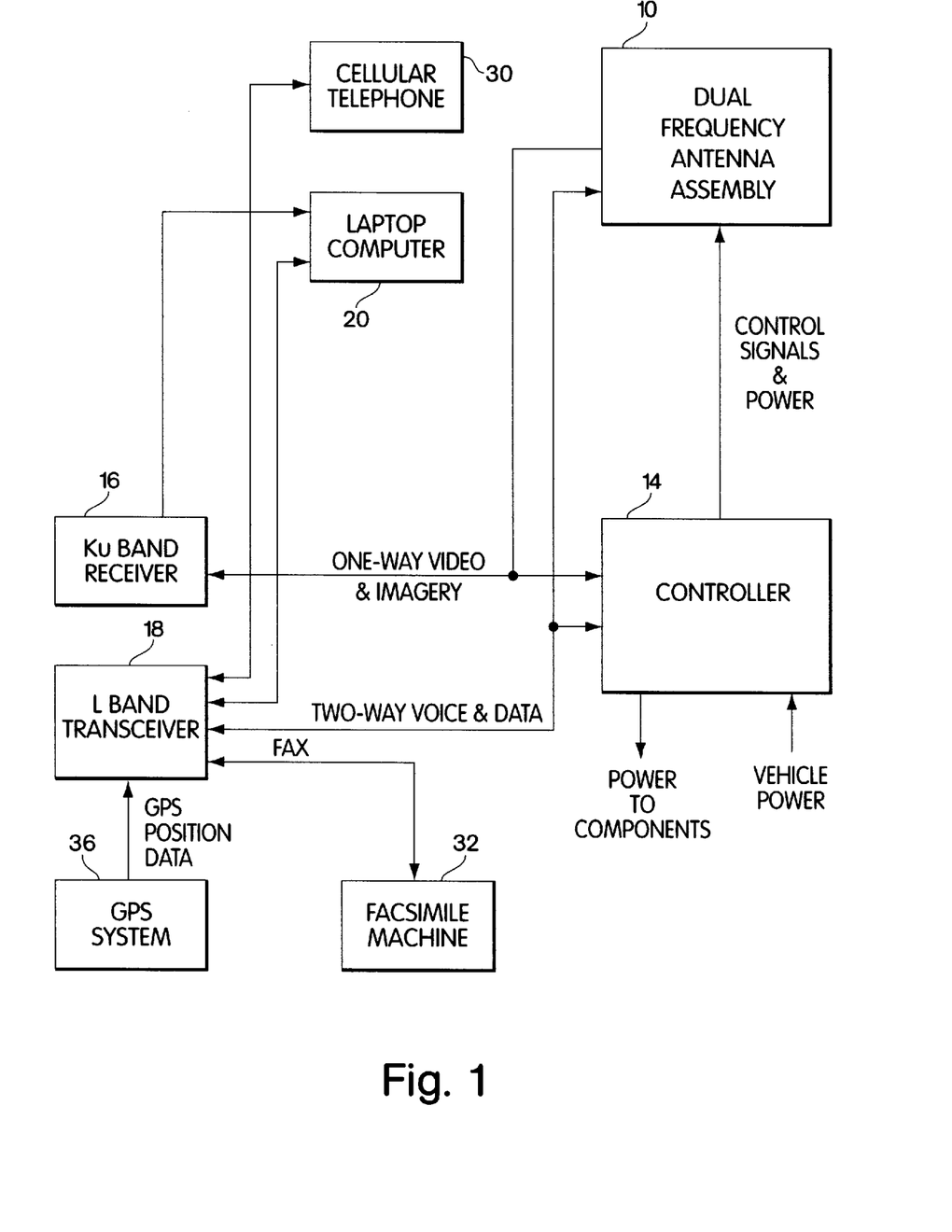
FIG. 1 is a block diagram of an example of a mobile satellite communication system in accordance with the invention.

A block diagram of an example of the mobile satellite communication system of the present invention is shown in FIG. 1. The system includes a dual-frequency, low-profile antenna assembly 10 which is mounted on the roof of a vehicle, a controller 14, a Ku band receiver 16, and an L band transceiver 18. The system may also include a computer 20, such as a laptop computer, a cellular telephone 30, and a facsimile machine 32. The cellular telephone 30 and the facsimile machine 32 communicate through transceiver 18. The transceiver 18 may receive GPS position data from a global positioning system 36.

The dual-frequency antenna assembly 10 supplies RF signals containing video and imagery data to Ku band receiver 16. RF signals containing voice and data are received by dual-frequency antenna assembly 10 and are supplied to L band transceiver 18. RF signals containing voice and data are transmitted by L band transceiver 18 through antenna assembly 10. The RF signals are supplied to controller 14 for use in the satellite tracking assembly as described below. The controller 14 supplies control signals and power to the antenna assembly 10. The controller 14 also receives vehicle power and supplies power as required by the components of the system. The cellular telephone 30 and the facsimile machine 32 communicate through the L band transceiver 18. The laptop computer 20 may receive video and imagery data from Ku band receiver 16 and may conduct two-way communication through L band transceiver 18. The system may be used to transmit a voice or data request to a remote location, receive a high speed video and imagery data response, and then confirm receipt of the data. The system can be used with a vehicle that is on the move or is stationary.

The Ku band receiver 16 may, for example, comprise an off-the-shelf Thompson Electronics Direct TV DBS receiver system. The L band transceiver may, for example, comprise a Westinghouse Electronics digital, dual-mode RF transceiver. Suitable laptop computers, cellular telephones, facsimile machines and GPS systems are well known to those skilled in the art and are commercially available.

Figure 2:
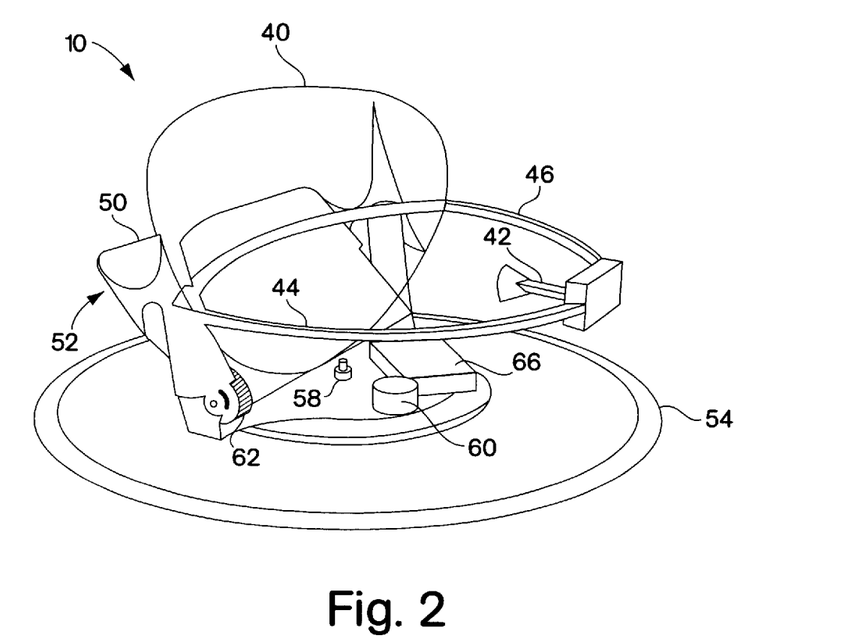
FIG. 2 is a perspective view of a first embodiment of the dual mode antenna assembly of FIG. 1.

A first embodiment of the dual-frequency, low-profile, self-steering antenna device 10 is shown in FIG. 2. The antenna assembly includes two antennas for simultaneously receiving the Ku band DBS video and imagery data signals and the L band AMSC two-way digital communication signals. In particular, the antenna assembly includes a low-profile elliptical reflector 40 designed for receiving the Ku band signals from the DBS satellite. The Ku band signals received by the elliptical reflector 40 are reflected and are collected by a circularly polarized waveguide feed horn 42. The feed horn 42 is supported by arms 44 and 46 in front of elliptical reflector 40. In one embodiment, the elliptical reflector 40 is made of a material, such as a carbon fiber based material, that is opaque to Ku band signal frequencies but which transmits L band frequencies. The elliptical reflector 40 may be provided with a periodic array of metal patterns printed on the carbon fiber based substrate so as to reflect Ku band signals and pass L band signals. The antenna assembly also includes an L band antenna 50. In one embodiment, the L band antenna 50 is a planar printed circuit board patch array antenna for receiving and transmitting the L band signals. In a preferred embodiment of the antenna assembly, the L band antenna 50 is located behind the Ku band elliptical reflector 40. With this arrangement, the two antennas can be configured in a small antenna envelope which can be supported by a vehicle. In one example of the antenna assembly, the antenna envelope is approximately 12 inches high by 24 inches in diameter. This size permits installation on vehicles of all sizes from intermediate sedans and larger.

An antenna device 52 includes elliptical reflector 40, feed horn 42 and L band antenna 50. The antenna device 52 moves as a unit with respect to a base 54. In particular, the antenna device 52 rotates in azimuth about a rotary joint 58, which defines a vertical axis, when an azimuth motor 60 is energized and rotates in elevation about an elevation axis when an elevation motor 62 is energized. An electronics module 66 may contain all or a portion of the control electronics for the antenna assembly. The antenna device 52 is mounted within a radome cover (not shown).

Figure 3:
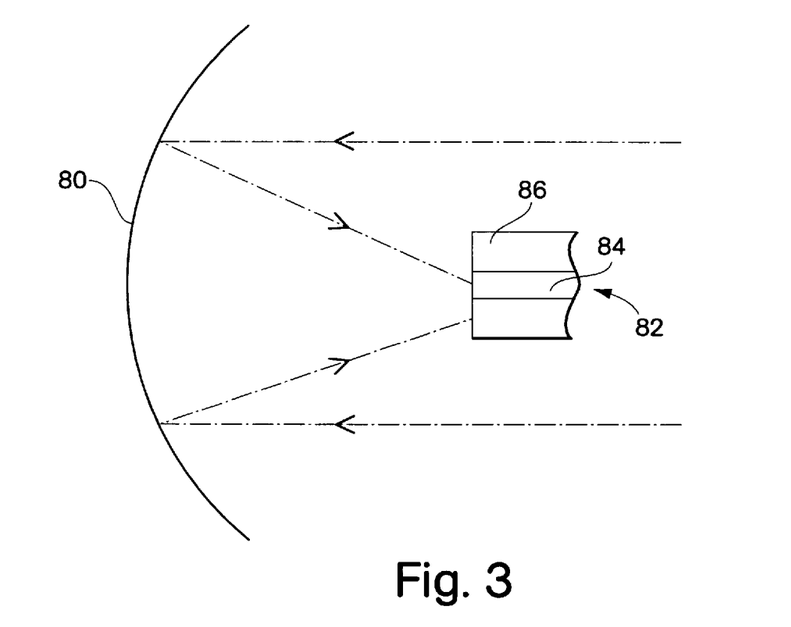
FIG. 3 is a schematic representation of a second embodiment of the dual mode antenna assembly of FIG. 1.

A second embodiment of the dual-frequency antenna device is shown schematically in FIG. 3. A compact reflector 80 is shaped so that it fits within a radome cover with a slim profile, suitable for vehicular applications. The reflector may for example be an elliptical offset reflector. A dual mode feed horn 82 is located with its phase center at the focal point of the reflector. The dual mode feed horn 82 provides the dual frequency capability with two concentric feeds combined. A circular waveguide feed 84 receives the video and imagery data signals from the DBS satellite. A concentric waveguide feed 86 wraps around waveguide feed 84 in a concentric manner, so that its phase center is at the same point as that of the feed 84. The concentric waveguide feed 86 transmits and receives two-way digital communication signals to and from the AMSC satellite. The feeds 84 and 86 share reflector 80 and thus represent a shared aperture dual mode antenna.

Figure 4:
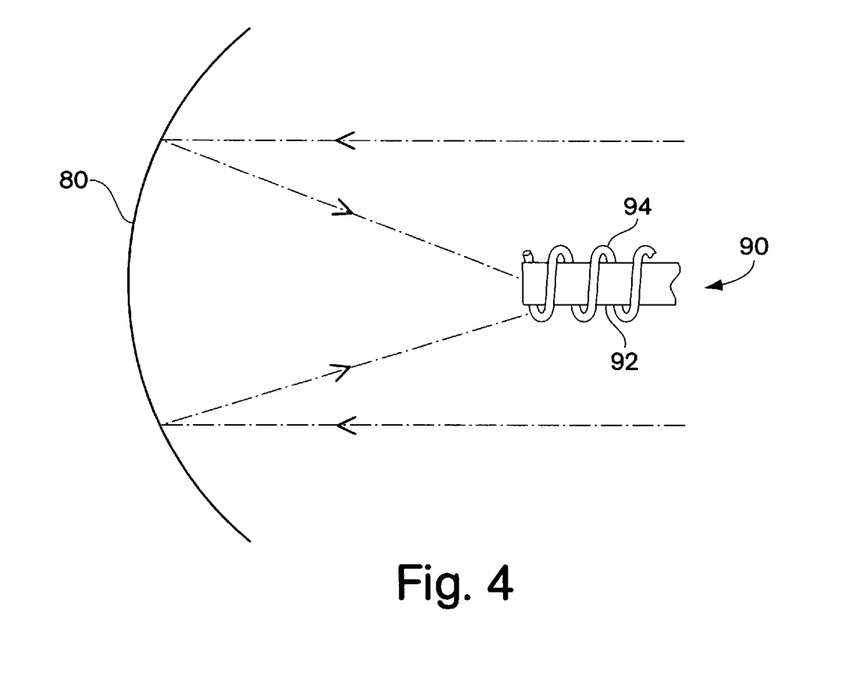
FIG. 4 is a schematic representation of a third embodiment of the dual mode antenna assembly of FIG. 1.

A third embodiment of the dual-frequency antenna device is shown schematically in FIG. 4. The reflector 80 operates with a dual mode feed 90 including a circular waveguide feed 92 and a helix antenna 94. The helix antenna 94 is wrapped around the circular waveguide feed 92. The waveguide feed 92 receives video and imagery data from the DBS satellite, and the helix antenna 94 transmits and receives two-way digital communication signals to and from the AMSC satellite. In the configuration of FIG. 4, waveguide feed 92 and helix antenna 94 have phase centers collocated at a focal point of reflector 80.

In yet another embodiment of the dual-frequency antenna assembly, a single reflector is used with a dual feed arrangement comprising a center waveguide feed for receiving video and imagery data signals from the DBS satellite and a microstrip antenna disposed around the center waveguide for transmitting and receiving two-way digital communication signals to and from the AMSC satellite.

Figure 5:
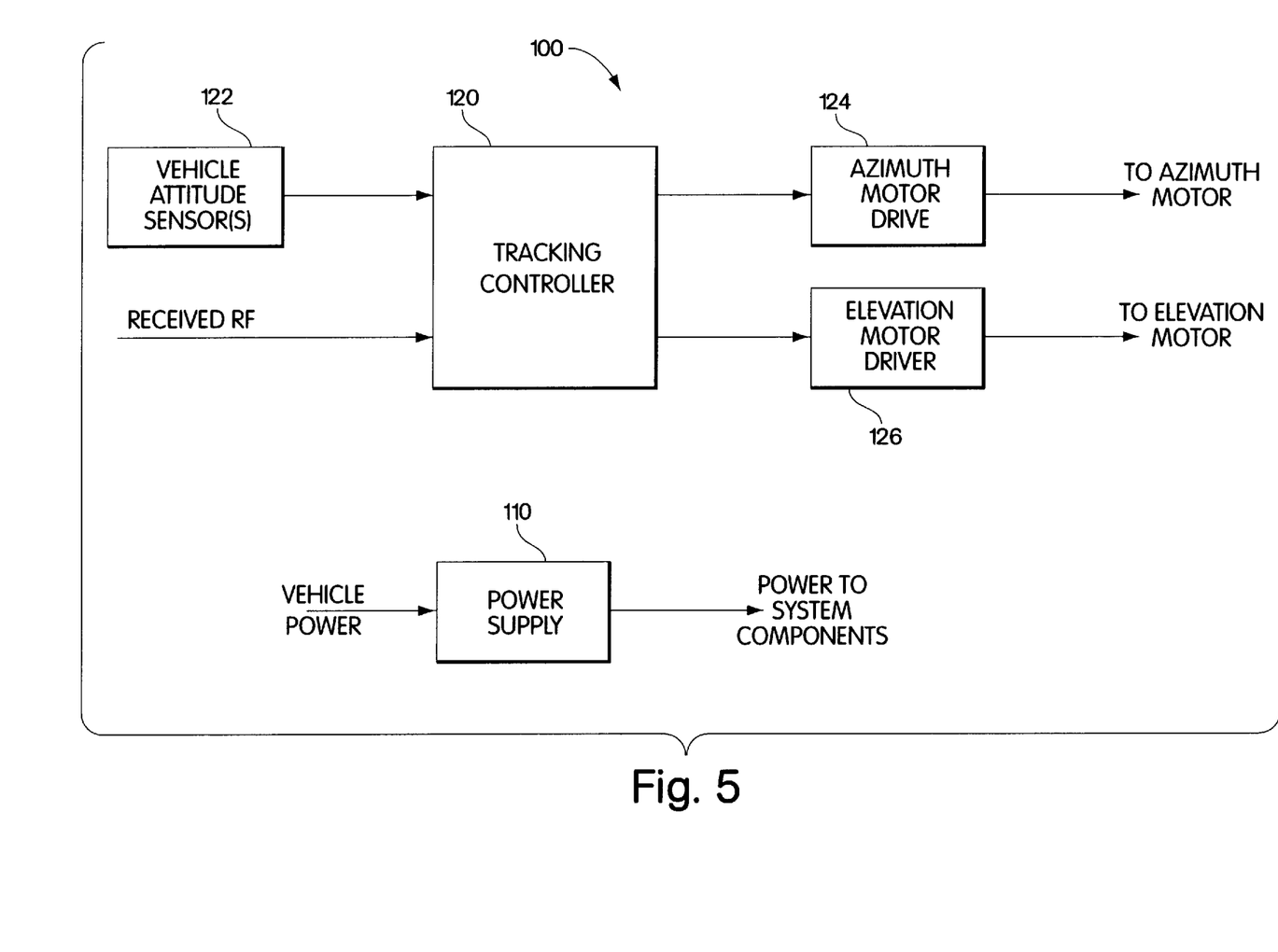
FIG. 5 is a block diagram of an example of the controller of FIG. 1.

A simplified block diagram of the controller 14 is shown in FIG. 5. The major components of the controller include a satellite tracking system 100 and a power supply 110. The power supply 110 receives vehicle power and supplies power, at required voltage and current levels, to other components of the mobile communication system that do not have self-contained power sources. For example, the power supply 110 supplies power to the satellite tracking system 100, the azimuth motor 60, and the elevation motor 62.

The purpose of the satellite tracking system 100 is to maintain the antenna device 52 (FIG. 2) pointed at the DBS and AMSC satellites whenever the system is in use and in particular when the vehicle is moving. In general, the tracking system 100 receives signals representative of the orientation of the antenna device 52 relative to the satellites, determines necessary corrections and provides control signals to azimuth motor 60 and elevation motor 62. The tracking system compensates for pitch, yaw and roll of the vehicle as the vehicle moves. As shown in FIG. 5, the satellite tracking system 100 includes a tracking controller 120 which may receive signals from one or more vehicle attitude sensors 122. An RF signal from antenna device 52 may also be input to tracking controller 120. The vehicle attitude sensor 122 may, for example, include an inertial sensor, such as for example a type DGI or DGC manufactured by KVH Industries, Inc. Alternatively, the vehicle attitude sensor 122 may include a digital gyro, an inclinometer, a compass, and/or solid-state devices such as quartz or piezo-electric turn rate sensors. The attitude sensor 122 senses changes in the attitude of the vehicle relative to the satellites. The received RF is used by the tracking controller 120 in an RF tracking system. The RF tracking system operates by maintaining the antenna device 52 pointed in a direction in which the received RF signal has maximum strength. The RF tracking system may include a circuit which dithers the antenna device over a prescribed angular range and permits the maximum received RF signal strength to be determined. The tracking controller 120 supplies a control signal to azimuth motor 60 through an azimuth motor driver 124 and supplies a control signal to an elevation motor 62 through an elevation motor driver 126.

The RF tracking system operates in a closed loop configuration. The attitude sensing portion of the satellite tracking system operates in an open loop configuration when the vehicle attitude sensor 122 is mounted on the vehicle. Alternatively, the vehicle attitude sensor 122 may be mounted on the antenna device 52, and the attitude sensing portion of the tracking system operates in a closed loop configuration.

The RF tracking system provides accurate tracking but typically has insufficient bandwidth to maintain satellite tracking during vehicle movement. The attitude sensing portion of the tracking system has a quick response and may be used to supplement the RF tracking system in a preferred embodiment. Attitude sensing, RF tracking or both may be used depending on the application of the mobile communication system.

Figure 6:
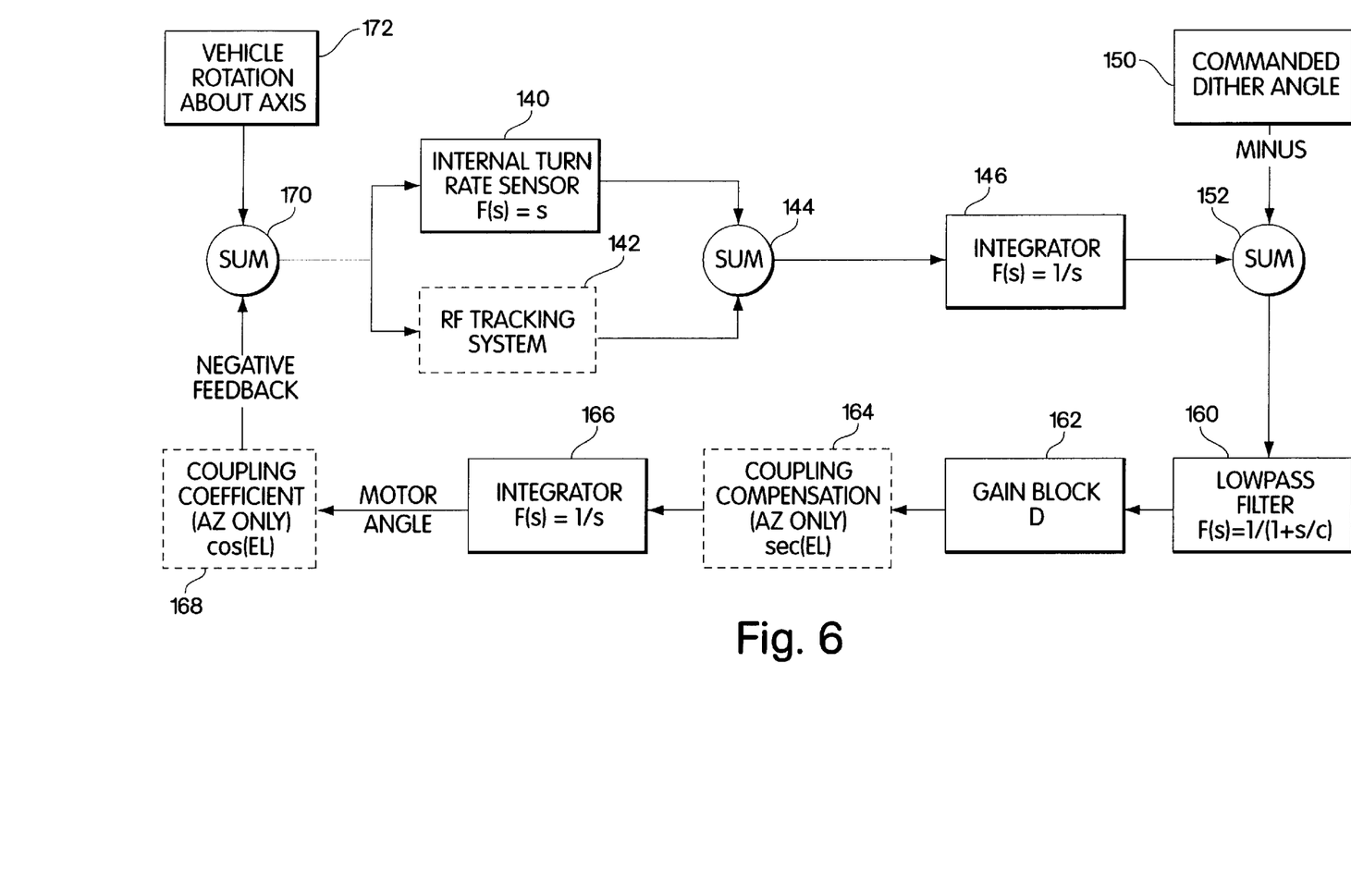
FIG. 6 is a flow chart showing operation of an example of the tracking controller of FIG. 5.

A schematic diagram of the operations performed by the tracking controller 120 for the vertical axis is shown in FIG. 6. Outputs of an inertial turn rate sensor 140 and an RF tracking system 142 are combined by a summing block 144 and supplied to an integrator 146. The inertial turn rate sensor 140 receives inputs from the vehicle attitude sensor 122, and the RF tracking system 142 operates on the received RF signal from antenna device 52. A dither angle supplied by block 150 is combined with the output of integrator 146 in a summing block 152. The output of summing block 152 is supplied through a low pass filter 160, a gain block 162, a coupling compensation block 164 and an integrator 166 to provide a motor control signal to azimuth motor driver 124 (FIG. 5). The coupling compensation block 164 is used only in the azimuth portion of the tracking controller 120 and compensates for the difference between the attitude sensor axis and the azimuth motor axis at different elevation angles of the antenna device. This difference is represented by the coupling coefficient of block 168. The instantaneous orientation of antenna device 52 is a combination, represented by summing block 170, of any vehicle rotation about the vertical axis (block 172) and any change in azimuth angle required by the tracking system.

The tracking controller operation represented by FIG. 6 is replicated for the elevation axis, with the coupling compensation block 164 and the coupling coefficient 168 omitted. In general, techniques for satellite tracking are known to those skilled in the art. Additional details regarding a suitable satellite tracking system are described in the aforementioned U.S. Pat. No. 5,398,035 to Densmore et al., which is hereby incorporated by reference. Satellite tracking systems are commercially available from KVH Industries, Inc. under the product name ASAP.

Having thus described at least one illustrative embodiment of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

I claim:

1. A mobile satellite communication system for use in a vehicle, comprising:

an antenna assembly mountable on the vehicle, including an antenna device for receiving first satellite signals from a first satellite in a first frequency band and for transmitting and receiving second satellite signals to and from a second satellite in a second frequency band, and a drive subassembly for rotating said antenna device relative to the vehicle in response to a control signal;

a satellite tracking assembly for determining the orientation of said antenna device and for providing said control signal to said drive subassembly so as to maintain said antenna device pointed at the first and second satellites as the vehicle moves;

a receiver coupled to said antenna device for receiving said first satellite signals in said first frequency band; and a transceiver coupled to said antenna device for transmitting and receiving said second satellite signals in said second frequency band.

2. A mobile satellite communication system as defined in claim 1 wherein said antenna device comprises a first antenna for receiving said first satellite signals in said first frequency band and a second antenna for transmitting and receiving said second satellite signals in said second frequency band.

3. A mobile satellite communication system as defined in claim 1 wherein said antenna device comprises a first antenna for receiving said first satellite signals in said first frequency band and a second antenna for transmitting and receiving said second satellite signals in said second frequency band, said first antenna comprising a reflector that reflects said first satellite signals and a horn for receiving the reflected signals, said second antenna being located behind said reflector, said reflector passing said second satellite signals in said second frequency band.

4. A mobile satellite communication system as defined in claim 3 wherein said first satellite signals in said first frequency band comprise video and imagery data signals transmitted in the Ku band and wherein said second satellite signals in said second frequency band comprise two-way digital communication signals transmitted in the L band.

5. A mobile satellite communication system as defined in claim 3 wherein said first satellite signals in said first frequency band are transmitted in the Ku band and said second satellite signals in said second frequency band are transmitted in the L band.

6. A mobile satellite communication system as defined in claim 1 wherein the first and second satellites are located in substantially identical geostationary orbits within a small angular arc with respect to said antenna device.

7. A mobile satellite communication system as defined in claim 1 wherein said antenna device comprises a first antenna for receiving said first satellite signals in said first frequency band and a second antenna for transmitting and receiving said second satellite signals in said second frequency band, said first antenna comprising a reflector that reflects said first satellite signals in said first frequency band and a horn for receiving the reflected signals.

8. A mobile satellite communication system as defined in claim 7 wherein said reflector comprises an elliptical reflector.

9. A mobile satellite communication system as defined in claim 8 wherein said second antenna comprises a planar printed circuit board patch array antenna.

10. A mobile satellite communication system as defined in claim 9 wherein said reflector passes said second satellite signals in said second frequency band and wherein said patch array antenna is located behind said reflector.

11. A mobile satellite communication system as defined in claim 10 wherein said reflector comprises an array of metal patterns formed on a carbon fiber based substrate.

12. A mobile satellite communication system as defined in claim 1 wherein said antenna device comprises a reflector for reflecting said satellite signals in said first and second frequency bands and a dual mode feed for receiving the reflected satellite signals from said reflector in said first and second frequency bands.

13. A mobile satellite communication system as defined in claim 12 wherein said dual mode feed comprises a helix antenna disposed around a waveguide feed.

14. A mobile satellite communication system as defined in claim 12 wherein said dual mode feed comprises first and second concentric circular waveguide feeds.

15. A mobile satellite communication system as defined in claim 12 wherein said dual mode feed comprises a microstrip antenna disposed around a waveguide feed.

16. A mobile satellite communication system as defined in claim 1 wherein said antenna device comprises first and second antennas mounted on a single base.

17. A mobile satellite communication system as defined in claim 1 wherein said satellite tracking assembly comprises an inertial sensor for sensing changes in the velocity and direction of the vehicle and an RF tracking system for tracking said satellite signals received by said antenna device.

18. An antenna system for use with a mobile satellite communication system in a vehicle, comprising:
an antenna assembly mountable on the vehicle, including an antenna device for receiving first satellite signals from a first satellite in a first frequency band and for transmitting and receiving second satellite signals to and from a second satellite in a second frequency band, and a drive subassembly for rotating said antenna device relative to the vehicle in response to a control signal; and
a satellite tracking assembly for determining the orientation of said antenna device and for providing said control signal to said drive subassembly so as to maintain said antenna device pointed at the first and second satellites as the vehicle moves.

19. An antenna system as defined in claim 18 wherein said antenna device comprises a first antenna for receiving said first satellite signals in said first frequency band and a second antenna for receiving said second satellite signals in said second frequency band, said first antenna comprising a reflector that reflects said first satellite signals in said first frequency band and a horn for receiving the reflected signals, said second antenna being located behind said reflector, said reflector passing said second satellite signals in said second frequency band.

20. An antenna system as defined in claim 19 wherein said first satellite signals in said first frequency band comprise video and imagery data signals transmitted in the Ku band and wherein said second satellite signals in said second frequency band comprise two-way digital communication signals transmitted in the L band.

21. An antenna system as defined in claim 19 wherein said first satellite signals in said first frequency band are transmitted in the Ku band and said second satellite signals in said second frequency band are transmitted in the L band.

22. An antenna system as defined in claim 18 wherein said antenna device comprises a reflector for reflecting said satellite signals in said first and second frequency bands and a dual mode feed for receiving the reflected satellite signals from said reflector in said first and second frequency bands.

23. An antenna assembly mountable on a vehicle for use with a mobile satellite communication system, comprising:
a first antenna for receiving video and imagery data signals from a direct broadcast satellite in the Ku band, said first antenna comprising a reflector that reflects said video and imagery data signals and a horn for receiving the reflected signals;
a second antenna for transmitting and receiving two-way digital communication signals to and from an AMSC satellite in the L band, said second antenna being located behind said reflector, said reflector being fabricated of a material that passes said two-way digital communication signals; and
a drive subassembly for rotating said first and second antennas relative to the vehicle in response to a control signal.

24. An antenna assembly as defined in claim 23 wherein said reflector comprises an elliptical reflector.

25. An antenna assembly as defined in claim 24 wherein said second antenna comprises a planar printed circuit board patch array antenna.

26. An antenna assembly as defined in claim 24 wherein said reflector comprises an array of metal patterns formed on a carbon fiber-based substrate.

27. A method for satellite communication, comprising the steps of:
mounting an antenna assembly on a vehicle, said antenna assembly including an antenna device and a drive subassembly for rotating said antenna device relative to the vehicle in response to a control signal;
receiving video and imagery data signals from a direct broadcast satellite in the Ku band with said antenna device;
transmitting and receiving two-way digital communication signals to and from an AMSC satellite in the L band with said antenna device; and
providing said control signal to said drive subassembly so as to maintain said antenna device pointed at the direct broadcast satellite and the AMSC satellite as the vehicle moves.

28. A method as defined in claim 27 wherein the step of mounting an antenna assembly includes mounting an antenna assembly having an antenna device comprising a first antenna for receiving said video and imagery data signals and a second antenna for transmitting and receiving said two-way digital communication signals, said first antenna comprising a reflector that reflects said video and imagery data signals and a horn for receiving the reflected signals, said second antenna being located behind said reflector, said reflector passing said two-way digital communication signals.

29. A mobile satellite communication system for use in a vehicle, comprising:
an antenna assembly mountable on the vehicle, including an antenna device for receiving video and imagery data signals from a direct broadcast satellite in the Ku band and for transmitting and receiving two-way digital communication signals to and from an AMSC satellite in the L band, and a drive subassembly for rotating said antenna device relative to the vehicle in response to a control signal;
a satellite tracking assembly for determining the orientation of said antenna device and for providing said control signal to said drive subassembly so as to maintain said antenna device pointed at the direct broadcast satellite and the AMSC satellite as the vehicle moves;

a receiver coupled to said antenna device for receiving said video and imagery data signals in the Ku band; and a transceiver coupled to said antenna device for transmitting and receiving said two-way digital communication signals in the L band.

* * * * *

UNITED STATES PATENT AND TRADEMARK OFFICE
CERTIFICATE OF CORRECTION

PATENT NO.    : 5,835,057
DATED         : November 10, 1998
INVENTOR(S)   : Martin Kits van Heyningen It is certified that error appears in the above-identified patent and that said Letters Patent is hereby corrected as shown below:

<u>Title page,</u>
Item [12], replace "van Heyningen" with -- Kits van Heyningen --.

Signed and Sealed this

Twenty-fourth Day of September, 2002

*Attest:*

JAMES E. ROGAN
*Attesting Officer*   *Director of the United States Patent and Trademark Office*